United States Patent [19]

Banks et al.

[11] Patent Number: 4,635,053

[45] Date of Patent: Jan. 6, 1987

[54] APPARATUS FOR SUPERVISING ACCESS TO INDIVIDUAL ITEMS

[76] Inventors: Edward J. K. Banks, 1, Fox Close, Wiggington, Tring, Hertfordshire, HP23 6ED; David J. Richardson, 7, Marigold Walk, Widmer End, High Wycombe, Buckinghamshire, HP13 6BZ, both of England

[21] Appl. No.: 647,724

[22] Filed: Sep. 6, 1984

[51] Int. Cl.⁴ .......................... H04Q 9/00; G08B 5/00

[52] U.S. Cl. .................................. 340/825.31; 221/2; 340/309.4; 340/825.35

[58] Field of Search ............ 340/518, 525, 568, 825.3, 340/825.31, 825.49, 825.35, 309.4; 364/900, 200, 479; 221/2, 3

[56] References Cited

U.S. PATENT DOCUMENTS

| | | | |
|---|---|---|---|
| 2,971,806 | 2/1961 | Andreason | 340/825.49 |
| 3,573,739 | 4/1971 | Zeitlin | 340/825.49 |
| 3,648,241 | 3/1972 | Naito et al. | 340/825.31 |
| 3,976,974 | 8/1976 | Hinohara et al. | 340/825.31 |
| 4,275,384 | 6/1981 | Hicks et al. | 340/309.4 |
| 4,288,780 | 9/1981 | Theodoru et al. | 340/825.31 |
| 4,549,170 | 8/1985 | Serres et al. | 340/568 |
| 4,575,719 | 3/1986 | Bertagna et al. | 340/825.35 |

OTHER PUBLICATIONS

European Patent Application, EP0071931 A2, Long et al, published Feb. 16, 1983.

European Patent Application, EP0030413 A1, Lundblad, published Jun. 17, 1981.

*Primary Examiner*—Donald J. Yusko

*Attorney, Agent, or Firm*—Laubscher & Laubscher

[57] ABSTRACT

Apparatus for monitoring and/or restricting access to individual items each provided with a unique identifying code comprises a console provided with a plurality of identical receptacles each for retaining one of a plurality of items. The receptacles are scanned one by one by a microprocessor and the identity of each of the items in the receptacles is obtained and recorded. When a user wishes to obtain an item he first identifies himself to the microprocessor using an identity card read by a card reader and by inputting a personal identity number by a keyboard. The item the user wishes is then identified to the computer using a keyboard and if all input information relating to user and item is correct the microprocessor causes an indicator lamp to be lit adjacent the receptacle containing the desired item and for a retaining latch holding the item in the receptacle to be released thus permitting the user to take the item. Details relating to the user, the item taken and the time of day are recorded.

10 Claims, 8 Drawing Figures

APPARATUS FOR SUPERVISING ACCESS TO INDIVIDUAL ITEMS

BACKGROUND OF THE INVENTION

The present invention relates to apparatus for supervising and/or restricting access by individuals to individual items.

SUMMARY OF THE INVENTION

The present invention provides apparatus for monitoring access to individual items each provided with a unique· identifying code, the apparatus comprising a plurality of identical receptacles each for receiving an individual item and each including means for interrogating the identifying code provided with the individual item, means for releasably securing an item in a receptacle, means operative by a potential user for identifying himself and the item which he wishes, and control means responsive to the means operative by a potential user for operating the retaining means to release the desired item when the user has correctly identified himself and the desired item.

Preferably, each receptacle is provided with an indicating device and the control means is arranged to operate the indicating device when the retaining means for that receptacle is released. This aids the user in locating the position of the item he desires.

The apparatus also provides means for recording details of the user as well as details of the item which he has withdrawn from a receptacle so that accurate records may be maintained.

BRIEF DESCRIPTION OF THE FIGURES

Features and advantages of the present invention will become apparent from the following description of a preferred embodiment thereof given by way of example with reference to the accompanying drawings, in which.

DETAILED DESCRIPTION

Although the invention is of general application, the specific embodiment will be described in relation to the use of the system for supervising and recording the allocation of vehicle ignition keys to authorised drivers and preventing the issue of keys to unauthorised personnel.

Figure 1:
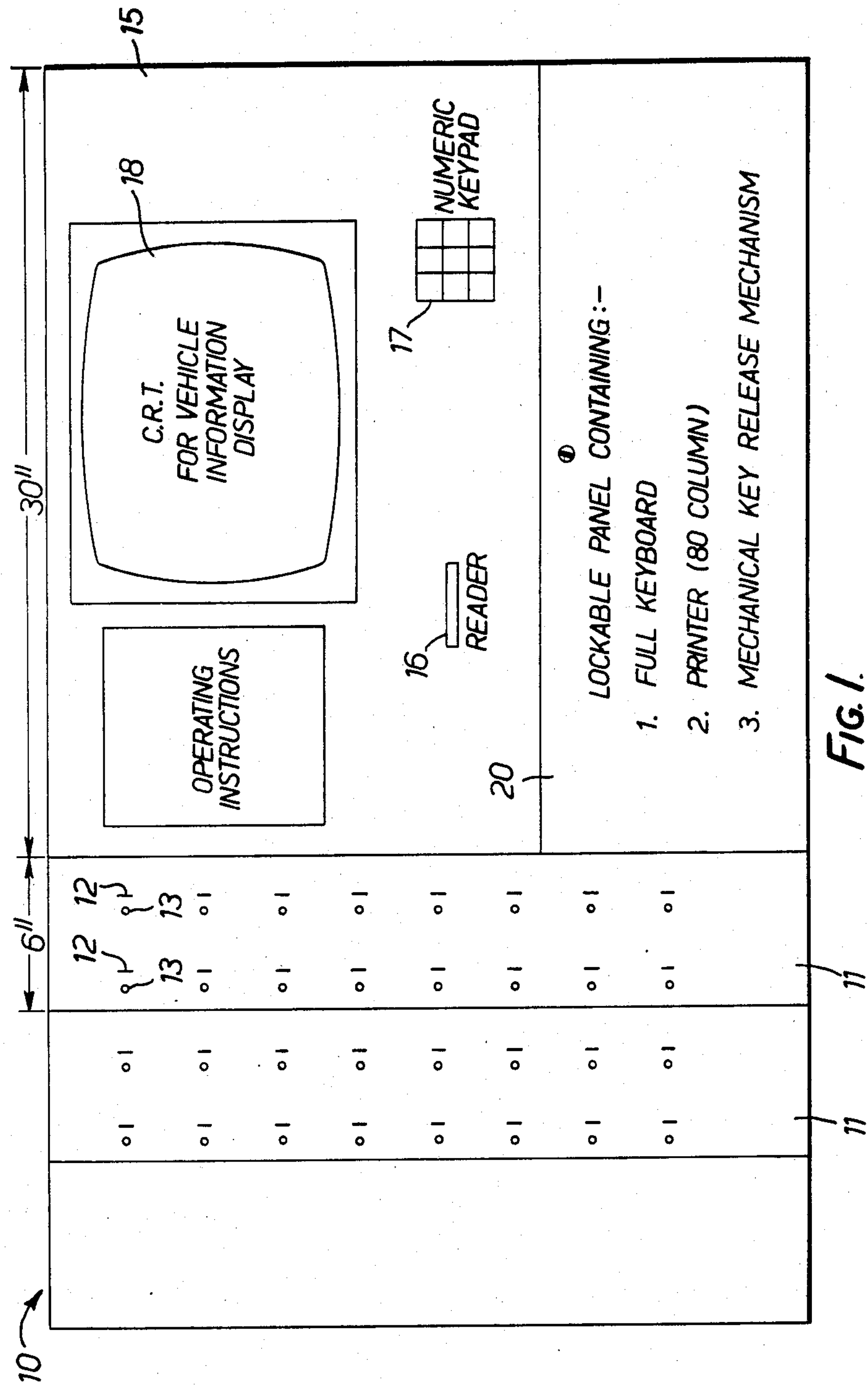
FIG. 1 shows a front view of a console.

Referring now to FIG. 1, there is shown a console 10 comprising at least one key panel 11, each panel containing a plurality, e.g. sixteen, of identical key hole slots 12 each with an associated indicator member 13 for indicating whether or not a key may be removed from the associated slot.

The keys are retained in the key slots 12 by means which will be described in more detail later with reference to FIG. 2 and in order for a driver to obtain a set of ignition keys or a vehicle, it is necessary for him to identify himself and the ignition keys which he requires so that the equipment will then release the desired key to the driver. The console is therefore provided with an interface section 15 comprising a card reading portion 16, a key pad 17 which is preferably simply a numeric key pad and a read-out device for vehicle information which is preferably in the form of a cathode ray tube 18.

A lockable panel 20 is also provided behind which there is a mechanical key release mechanism for overriding the normal electronics should there be a fault in the system, a full keyboard and a printer for providing full records of when and to whom each individual set of ignition keys has been issued over a particular period for example a day or a week.

Figure 2:
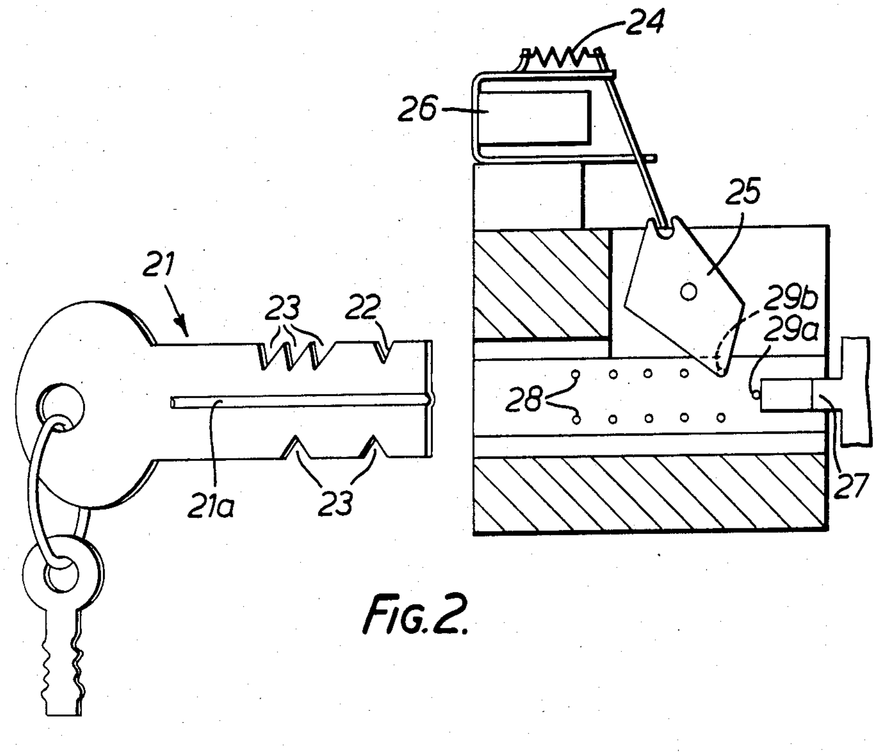
FIG. 2 shows diagrammatically how individual items may be retained in the console.

Referring now to FIG. 2, there is shown diagrammtically how a key may be retained in a key slot 12. In the present embodiment, it is conceived that the ignition key will be attached to an encoded key by means of a welded keyring. The encoded key is arranged to be read electronically by any suitable means. This is because normal keys are not suitable for retention in the key slots and proper electronic identification therein. However, it is conceivable that in the future suitable keys will be manufactured in which case the need for a separate encoded key would disappear. Further, although the encoded member is called a key it would take any convenient form as long as it could be retained in the key slot and selectively released therefrom after proper identification.

As shown in FIG. 2, each encoded key comprises an elongate portion 21 provided with a retaining slot 22 in one edge and is uniquely encoded in some convenient manner to enable the apparatus within the console to identify the particular key. The encoded keys may be provided with means whereby the key may be inserted into a slot 12 in only one orientation. This is conveniently done by providing one side of the key with a longitudinally extending groove 21*a*. In this case, the key is provided with grooves 23 in one or both of its opposite side edges, the grooves being in a particular order and location individual to the key. The encoded key is retained in the slot 12 by a member 25 which is spring biased into the recess 22 by means of a spring 24 but is selectively removed therefrom by means of a solenoid 26 controlled by a microprocessor which is responsive to the operation of the card reader 16 and the keypad 17. A stop 27 is provided to locate the key within the key slot whereby the key is substantially immovable due to the stop 27 and member 25 clamping a portion of the key therebetween.

There is also provided a key reading apparatus for reading the code on the key inserted in the slot 12. The type of reading apparatus used depends upon the way in which the key is coded. In this case, because of the use of the slots in the edges of the key, it is possible to use light transmission through the slots or reflection from the protrusions between slots to identify the individual key. This is a well known technique and detailed elaboration of it is thought not necessary in this document. Suffice to say, that a plurality of light emitting devices 28 are provided and arranged to be in register with positions on the encoded key where slots 23 are or are likely to be present. The corresponding light detecting devices are not shown. In this embodiment, a further light emitting device 29*a* is provided which, with its associated light detecting device (not shown), act as an indication of whether or not an encoded key is present at that location in the console. It is alternatively possible to use one of the devices 28 for the same purpose but this reduces the number of code combinations. A light emitting device 29b detects the presence of member 25 in a latching position and can be used together with device 29a as an indication of correct operation of the retention mechanism and/or tampering with the slot to obtain a key illegally. Plates which are transparent to the light emitted by the devices 28 are positioned in each key slot 12 on either side of the encoded key.

Figure 3:
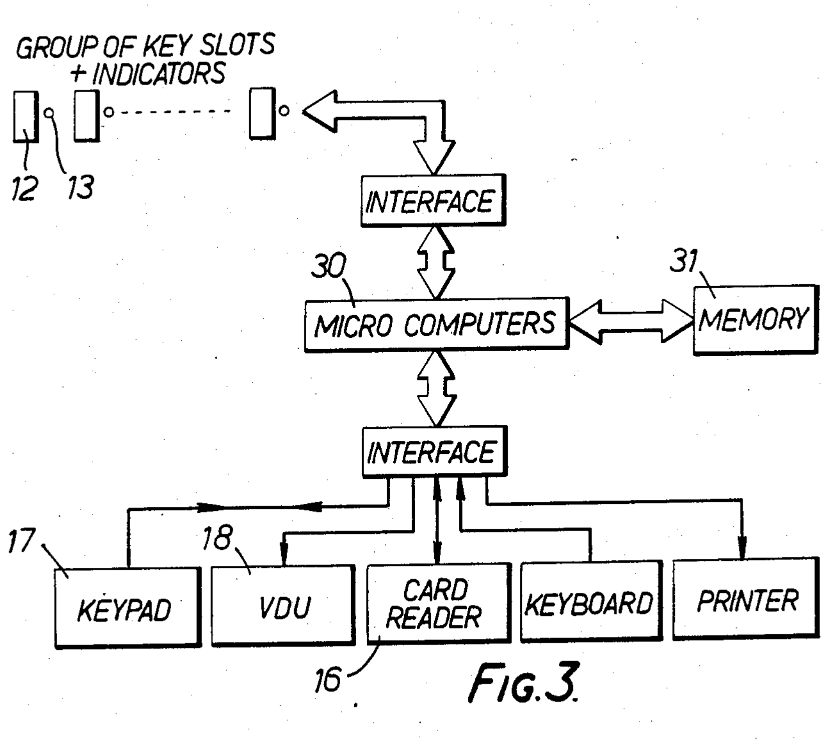
FIG. 3 shows a block diagram of the electrical circuit used in the console of FIG. 1.

The operation of the system will now be explained in more detail with reference to FIG. 3 which shows a block diagram of the system.

Initially, a supervisor inserts encoded keys each attached to a set of vehicle ignition keys into the empty key slots 12 in any arbitrary order. A microcomputer 30 then interrogates each key and stores in its memory 31 the equivalent vehicle number and the key slot 12 in which the encoded key has been placed. The supervisor opens the panel 20 and by means of the keyboard contained behind the panel 20 inserts into the microcomputer 30 details of all vehicles corresponding to the ignition keys attached to the encoded keys and also of all drivers where it is necessary to restrict the issue of certain vehicles to certain drivers. This is done for all vehicles and drivers covered by the system. The system may comprise one or more consoles.

In order to obtain a set of vehicle keys, a driver inserts his identification card into the card reader 16 in the console. As an added security measure, he may also have to key in a personal identity number using the key pad 17 for comparison by the micro-computer 30 with a corresponding number on the indentity card before the micro-computer will consider that it has received a valid instruction. If the identity card is accepted, the driver selects the vehicle keys he wishes by using the key pad 17 to enter a number indicative of the vehicle. If the computer accepts this instruction, and if the vehicle key is held in the console, the micro-computer 30 will cause the indicator 13 adjacent the stored key to be luminated and also to cause the solenoid 26 associated with that particular key to be activated to release the key.

When the vehicle keys have been withdrawn the computer 30 stores the driver's identity, the issued key number and the time and date of issue of the keys. It will also provide an indication on the cathode ray tube 18 that the vehicle is in use. In this way, it is very easy for a further driver to determine which vehicles are in use and which are available for use.

When the driver returns the vehicle keys, he merely places the encoded key in any available key slot 13. The computer will then store in its memory the keys for the vehicle that were taken out by a particular driver at a particular time and date and were returned at a different time and possibly a different date and possibly a different console.

Figure 6A:
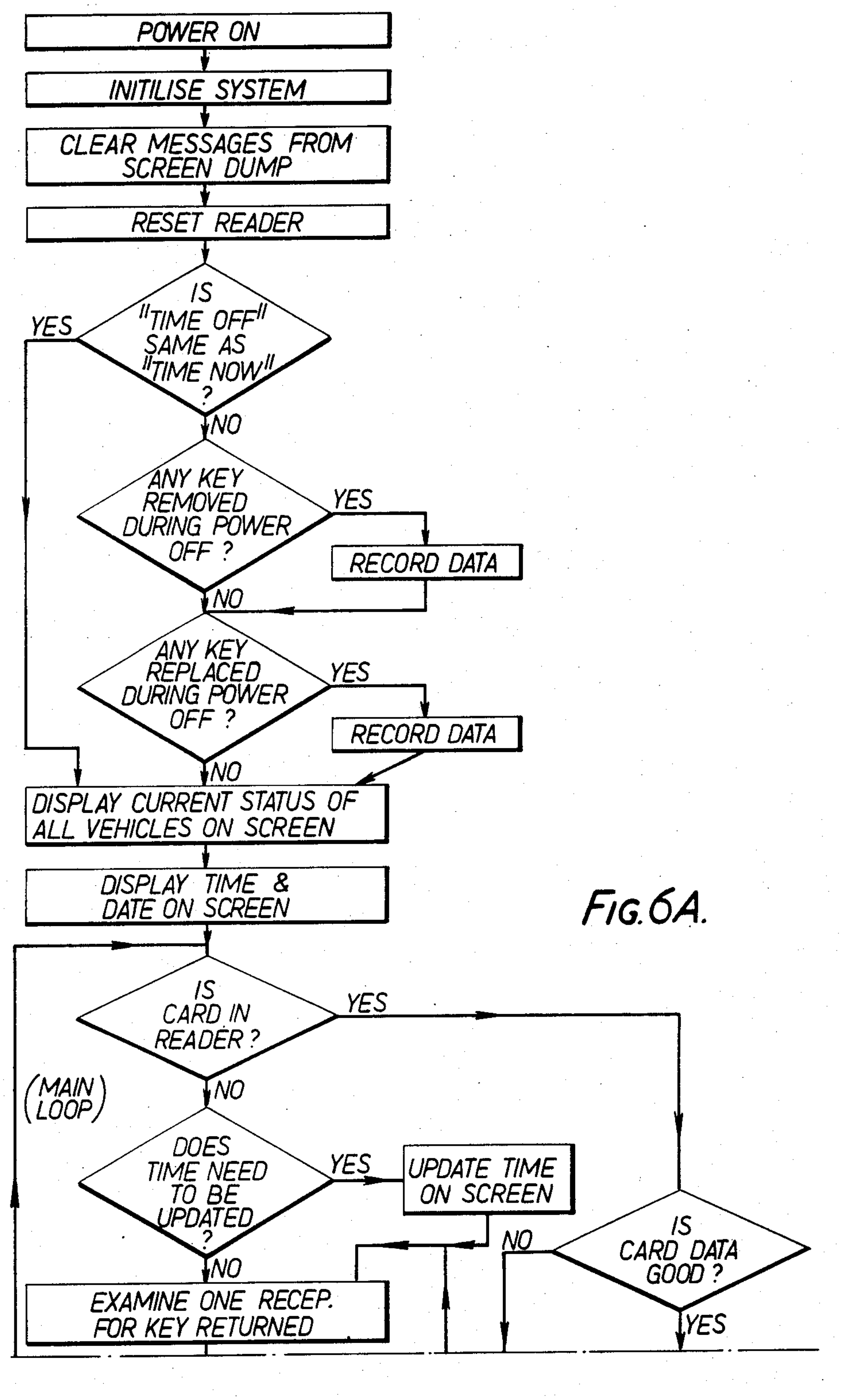
FIGS. 6A–C show a flow chart to assist understanding of the operation of the apparatus.
Figure 6B:
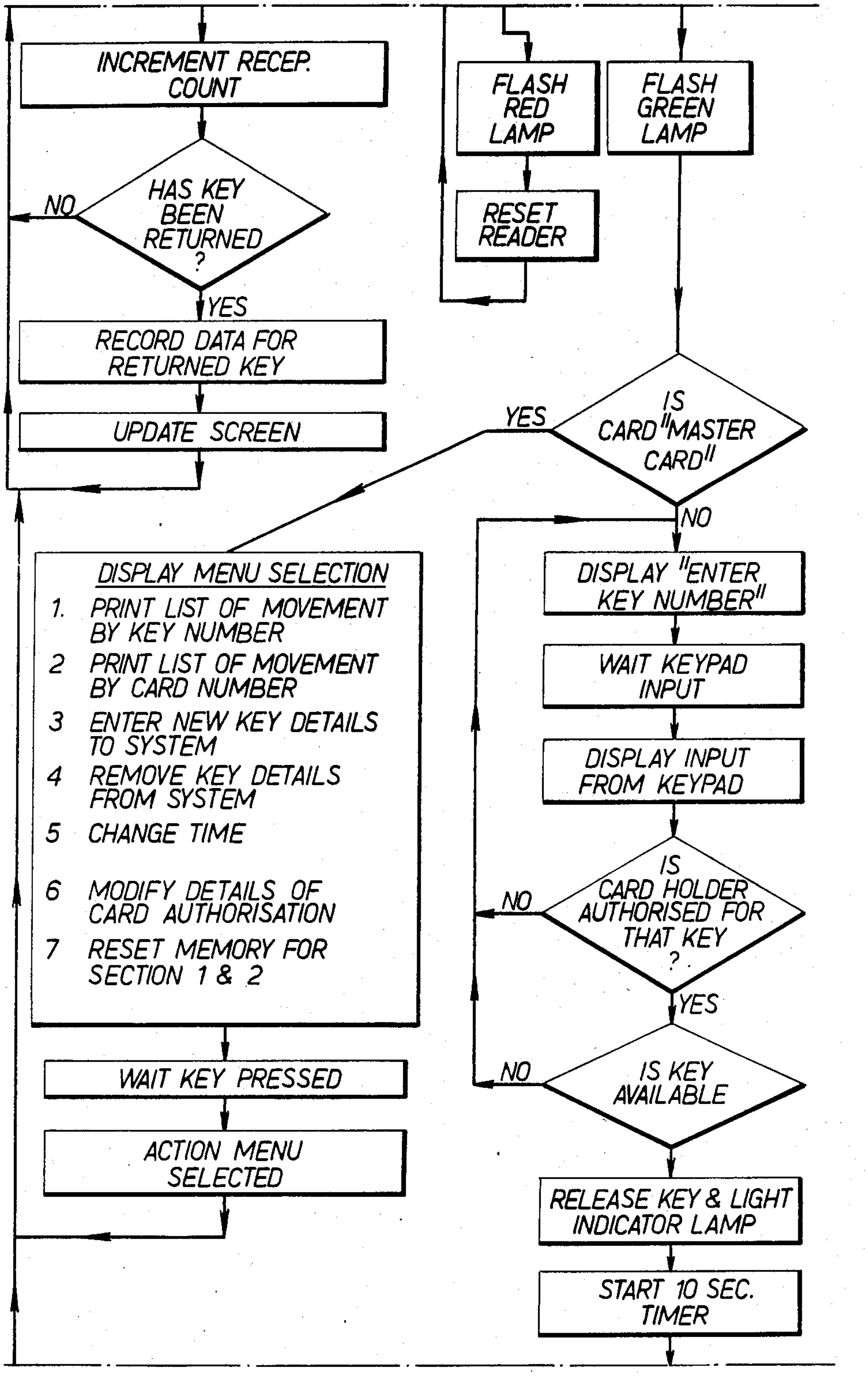
Figure 6C:
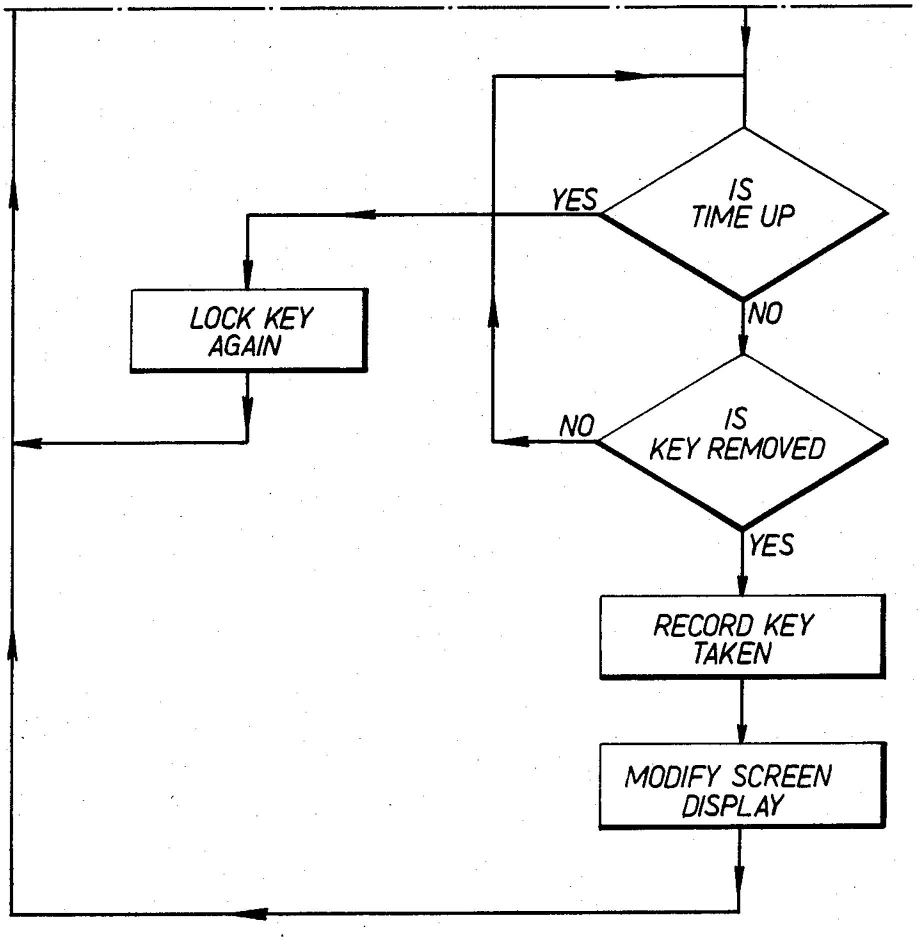

The computer scans each of the key slots in turn to regularly update its memory regarding keys released and to whom. A flow chart explaining the microprocessor operation in more detail is shown in FIG. 6 and it is considered that, taken with the above description, no further explanation of it is required.

With this system, a number of consoles may be provided each at a different location as long as the microcomputer 30 in each console is provided with information relating to all possible vehicles and all possible drivers. In this way, it is not necessary for a driver to return vehicle keys to the location from which they were issued. The computer at terminal X will record issue details while the computer at terminal Y will record return and possible re-use details.

Daily or at any suitable longer period a supervisor may extract the issue transactions by using the keyboard located behind a lockable panel 20 in each console. The information relating to key removal and replacement at that console is then printed using the printer. As an alternative, the computer at one console may be able to interroage the computers at any other console so that full details of the movements of all vehicles can be collated at a single point. Also when using a plurality of consoles the micro-computers may be able to pass information between themselves so that the cathode ray tube at any one console will be able to give information regarding the status of any vehicle in the fleet.

Figure 4:
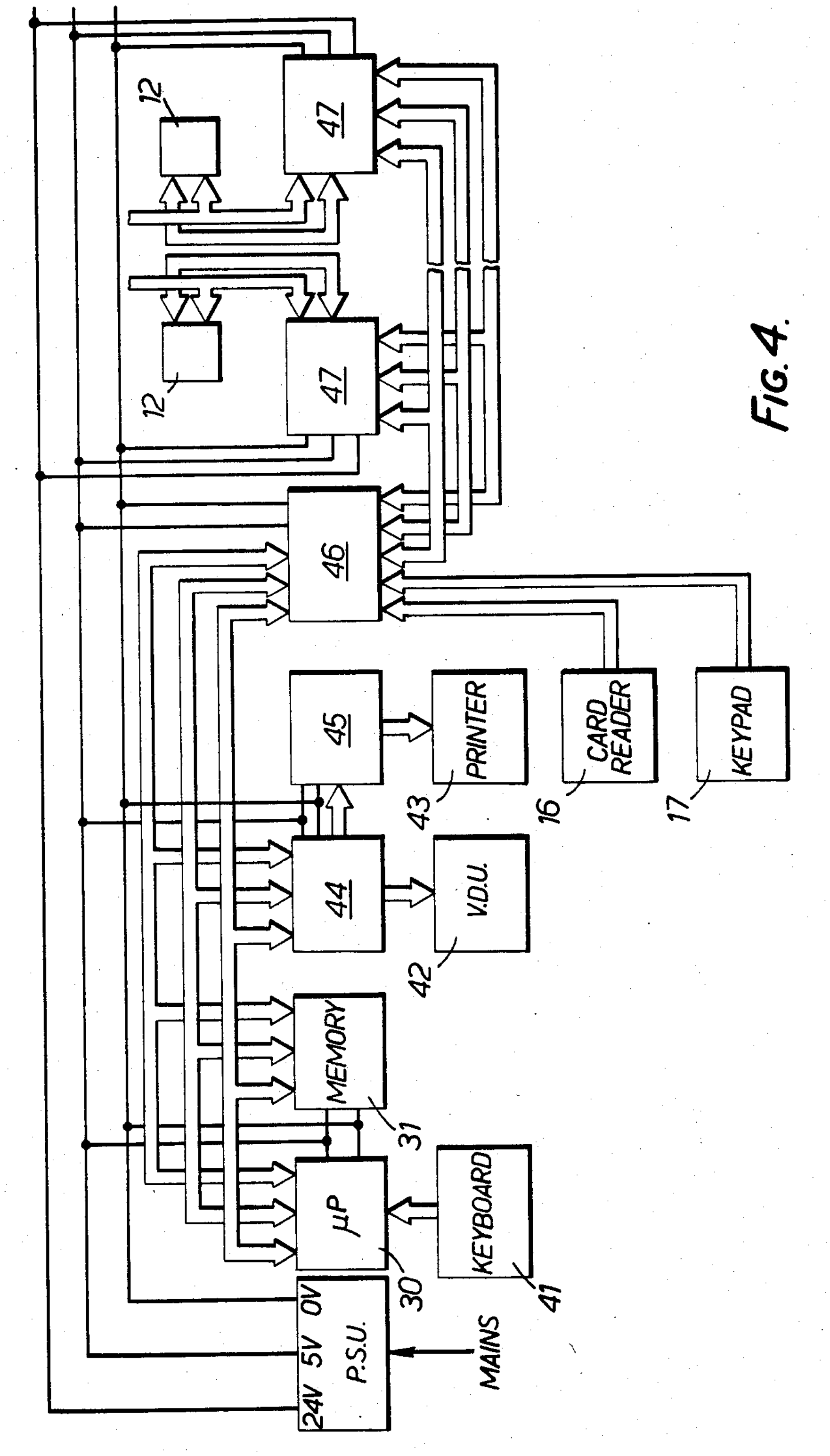
FIG. 4 is a more detailed block diagram of the electrical circuit shown in FIG. 3.
Figure 5:
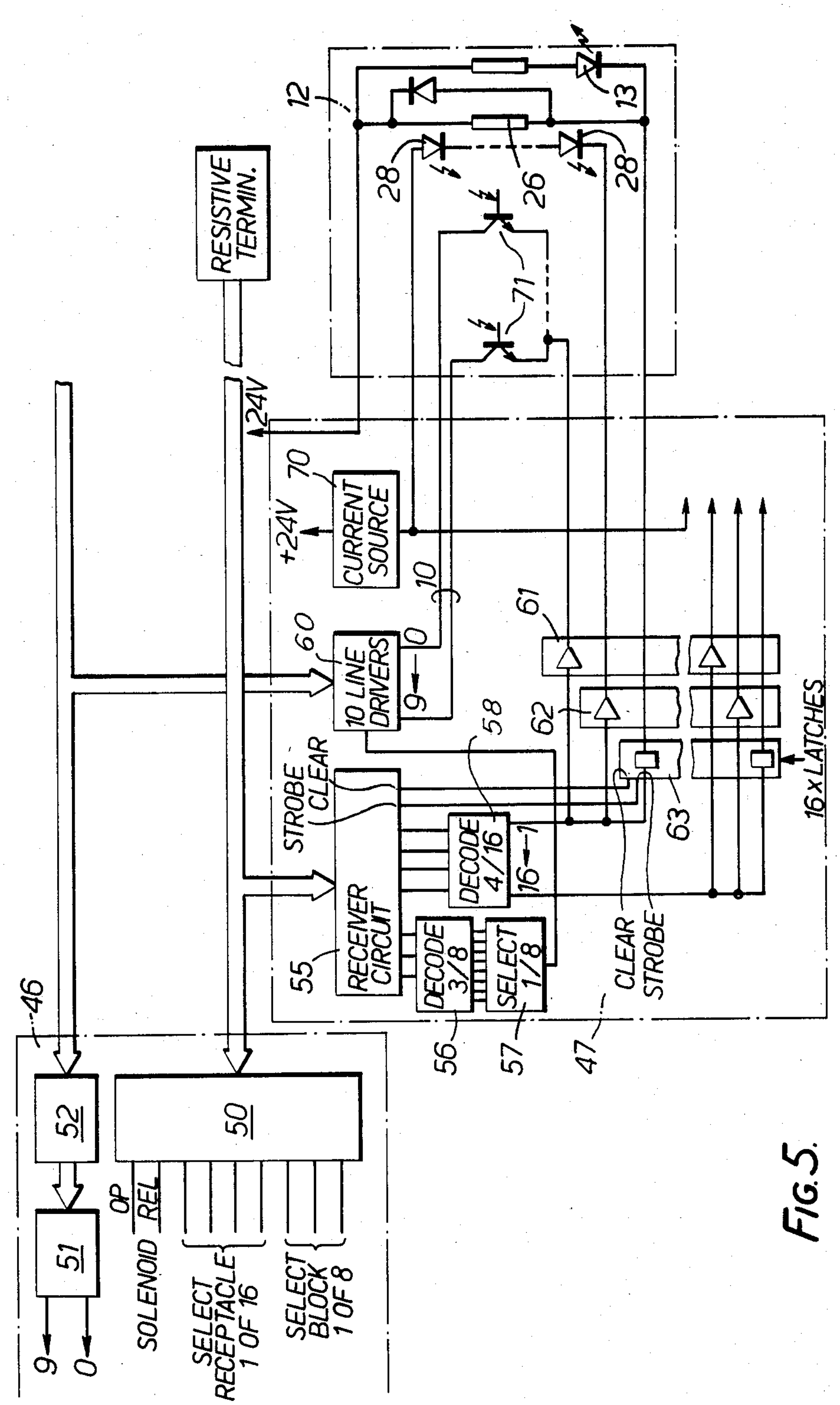
FIG. 5 is a block diagram showing in more detail parts of the block diagram shown in FIG. 4.

A more detailed description of the apparatus will now be given with reference to FIGS. 4 and 5. FIG. 4 shows a more detailed block diagram than that shown in FIG. 3 while FIG. 5 shows in still more detail a part of the block diagram shown in FIG. 4. Where appropriate the same reference numerals are used throughout to represent same parts.

The system is based on a 6502 microprocessor 30 which includes a battery backed memory and real time calendar clock. A keyboard 41 which is the keyboard located behind the lockable panel 20 in each console is used to input or retrieve information to or from the computer. As is customary, the microprocessor is connected to the other operative blocks in the system by address, data and control busses. In this way, information relating to vehicle keys issued and the recipient of the keys is obtained by the microprocessor and stored in a battery backed memory 31. Also, relevant information may be displayed on a VDU 42 or printed on a printer 43 which is the printer contained behind a lockable panel 20 in each console under control of the microprocessor 30. The VDU and printer are controlled via a video interface 44 and a printer interface 45.

The microprocessor 30 also receives information from a card or badge reader 16 and a keypad 17 through interface circuit 46 a part of which is also used to tranfer data and control bus signals to key slots 12 which it will be recalled are arranged in groups. In this instance, there are sixteen key slots in each group and there are up to eight groups associated with each microprocessor. Each group of key slots 12 is provided with its own interface 47 so that each key slot may be addressed in turn in order to retrieve data identifying the keys contained in the individual key slots as well as permitting control of the latches on each key slot. It will be noted that each key slot feeds key data onto a common data bus whereas there are individual control busses for each key slot. The construction of the interfaces 46,47 and of the key slots 12 will be described in more detail with reference to FIG. 5 to which attention is now directed. There will be no detailed description of the microprocessor block 30, the battery backed memory block 31, the video interface 44, or the printer interface 45 due to the fact that these are all commercially available units obtainable from Messrs. Control Universal Limited of Cambridge.

From FIG. 5 it will be seen that the interface circuit 46 in so far as it is concerned with the key slots, comprises a line driver chip 50 which is used to select which group of key slots will be addressed and which key slot within the adressed group will then be addressed. The interface circuit 46 also includes a line receiver circuit 51 for receiving key data from each addressed key slot in turn via resistive terminators 52. The output from the circuit 51 is fed to the memory 31 under the control microprocessor 30.

The addressing of individual key receptacles will now be described in more detail. The line driver circuit 50 is arranged to select and control 9 lines grouped as follows: 3 lines are used to select 1 of 8 blocks, 4 lines are used to select 1 of 16 receptacles in a block and 2 lines are used to control the operation of the solenoid 26 in each key slot which is used as part of the latching mechanism for retaining a key in the key slot.

FIG. 5 shows only one block interface 47 although it will be appreciated that it will be possible to have a further 7 interfaces. Further, although up to 16 key receptacles can be connected to anyone block interface, only two receptacles 12 are shown.

The block interface 47 comprises a line receiver circuit 55 connected to the bus which receives output signals from the line driver circuit 50. The circuit 55 receives signals from the circuit 50 and outputs signals on 9 lines. Three of the outputs of the circuit 55 are fed to a decoder circuit which together with a one of eight select switch identifies whether or not the computer is addressing a receptacle in the group of receptacles associated with the interface 47. If a receptacle within the relevant group is being addressed, the output of the select one of eight switch 57 is used to enable a further decode circuit 58 connected to a further four outputs of the circuit 55 as well as a line driver circuit 60 whose operation will be described in more detail later.

The decode circuit 58 receives our outputs from the circuit 55 and produces an output on one of 16 output lines each of which is connected to a respective receptacle, the output line receiving a signal depending on which receptacle is being addressed.

Each output line from the decoder 58 is fed to its respective receptale via three driver circuits which are a light detecting driver circuit 61, a light emitting device driver circuit 62 and a solenoid and indicator lamp latch circuit 63.

The operation of the circuitry will now be described in more detail. When a key receptacle is to be interrogated by the microprocessor 30 in order to determine which key is contained in that receptacle, appropriate signals are sent via the line driver circuit 50 in order to address the correct block interface 47 using the decoder circuit 56 and the select switch 57 and then the key receptacles within that group are scanned in turn via the decoder circuit 58. When a key receptacle is to be interrogated, an interrogating signal is present on the output line from the decoder circuit 58 representing that receptacle and an interrogating signal is thus fed to each of the circuits 61,62 and 63. The presence of a signal at the circuit 62 causes all the light emitting devices 28 to be energised due to the fact that they are connected in series between the driver circuit 62 and a constant current source 70. Further, the presence of the interrogating signal at the driver circuit 61 enables the light detecting devices indicated by the reference numeral 71 so that in the presence of a key various of the light detecting devices are energised due to the slots having been cut in the edges of the key and signals are provided from the light emitting devices to the driver circuit 60 which in turn provides key data signals on to a key data bus connected to the key data line receiver 51.

If the interrogated key slot contains a key which has been asked for by a potential user, the microprocessor 30 generates a signal which is fed to the latch circuit 63 which, together with signal output from the decoder 58 causes energisation of the solenoid 26 which is connected between the latch circuit 63 and a power line. Simultaneously, a light emitting diode constitutes the indicator 13 is also illuminated due to it being connected in parallel across the solenoid 26 to indicate to the user which key slot contains the key which he has requested.

As mentioned above, the previous description in relation to supervising the issuing of vehicle keys is but one use of the system. Another is for stock control in which case the encoded keys and key slots may be replaced by encoded lockable drawers or other receptacles.

What is claimed is:

1. Apparatus for monitoring access to individual items each of which is provided with a unique identifying code, comprising:
   (a) a plurality of identical receptacles for receiving one of a plurality of individual items, respectively, each of said receptacles including
      (1) means for interrogating the unique identifying code of each item;
      (2) means for releasably securing an item within said receptacle; and
      (3) indicator means for indicating the presence and absence of an item relative to said receptacle;
   (b) identfication means operable by a potential user for identifying himself and a desired item;
   (c) detection means for detecting in which one receptacle of said plurality of receptacles the desired item is arranged; and
   (d) control means connected between said receptacles and said identification and detection means for operating said securing means associated with said one receptacle to release the desired item in response to the correct identification of the potential user and the desired item, said control means further operating said indicator means associated with said one receptacle when said securing means associated with said one receptacle is released.

2. Apparatus as defined in claim 1, wherein said detecting means further detects the presence of an item in each receptacle.

3. Apparatus as defined in claim 2, wherein said detecting means comprises a microprocessor operatively connected with said receptacle interrogating means and responsive to said presence detecting means for identifying which items are arranged in which of said receptacles.

4. Apparatus according to claim 3, and comprising a clock device and a memory device, the memory device being operatively connected and responsive to the microprocessor for storing information relating to an item removed from a receptacle and the time of removal.

5. Apparatus according to claim 1, wherein the means for identifying a user comprises card reading means for reading an identification card.

6. Apparatus according to claim 1, wherein the means for identifying a user comprises a keyboard for inputting a user identifying code.

7. Apparatus according to claim 1, wherein the means for interrogating the identifying code provided with an individual item comprises light emitting and light detecting means.

8. Apparatus as defined in claim 7, wherein each individual item includes an elongate member bearing the identifying code for that item;

each receptacle includes a channel for receiving the elongate member;

said light emitting means comprises a row of light emitting diodes for directing light across said channel; and said light detecting means comprises a row of light detecting devices opposite said row light emitting diodes relative to said channel for receiving the light transmitted therefrom, respectively.

9. Apparatus according to claim 8, wherein the number of light detecting devices is equal to the number of light emitting devices.

10. Apparatus according to claim 8, wherein the light emitting devices are connected in series with a current source and the light receiving devices are connected in parallel with each other.

* * * * *